US010732147B2

(12) United States Patent
Deivasigamani et al.

(10) Patent No.: US 10,732,147 B2
(45) Date of Patent: Aug. 4, 2020

(54) IN SITU FUEL-TO-AIR RATIO (FAR) SENSOR FOR COMBUSTION USING A FOURIER BASED FLAME IONIZATION PROBE

(71) Applicants: Sridhar Deivasigamani, Peoria, IL (US); Sivaprasad Akasam, Dunlap, IL (US); Quang-Viet Nguyen, Aldie, VA (US)

(72) Inventors: Sridhar Deivasigamani, Peoria, IL (US); Sivaprasad Akasam, Dunlap, IL (US); Quang-Viet Nguyen, Aldie, VA (US)

(73) Assignee: Intellihot, Inc., Galesburg, IL (US)

( * ) Notice: Subject to any disclaimer, the term of this patent is extended or adjusted under 35 U.S.C. 154(b) by 334 days.

(21) Appl. No.: 15/888,047

(22) Filed: Feb. 4, 2018

(65) Prior Publication Data

US 2019/0242850 A1    Aug. 8, 2019

(51) Int. Cl.
*G01N 27/62*    (2006.01)

(52) U.S. Cl.
CPC .................................. *G01N 27/626* (2013.01)

(58) Field of Classification Search
CPC .. G01N 27/626; F01K 21/047; F02D 41/0047
See application file for complete search history.

(56) References Cited

U.S. PATENT DOCUMENTS

| 5,275,712 A * | 1/1994 | Hetrick | G01N 27/626 204/425 |
| 2004/0123653 A1* | 7/2004 | Benson | F23N 1/022 73/114.12 |
| 2007/0107417 A1* | 5/2007 | Surnilla | F02D 41/0087 60/285 |
| 2009/0180939 A1* | 7/2009 | Hagen | F01K 21/047 422/600 |

OTHER PUBLICATIONS

J. W. Girard, R. W. Dibble, L.O. Arellano, K. O. Smith, "Use of an Extractive Laser Probe for Time-Resolved Mixture Fraction Measurements in a 9 atm Gas Turbine Fuel Injector," ASME Paper 2001-GT-0372, 2001.
Q.V. Nguyen, "Measurements of Equivalence Ratio Fluctuations in a Lean Premixed Prevaporized (LPP) Combustor and its Correlation to Combustion Instability," Proceedings of ASME Turbo Expo 2002, Amsterdam, The Netherlands, 2002.
J. A. Silver, "Frequency-modulation spectroscopy for trace species detection: theory and comparison among experimental methods," Applied Optics, vol. 31, Issue. 6, pp. 707-717, 2002.

(Continued)

*Primary Examiner* — Mohamed Charioui
(74) *Attorney, Agent, or Firm* — Tracy Jong Law Firm; Tracy P. Jong; Cheng Ning Jong

(57) ABSTRACT

A means of detecting the in-situ fuel-to-air-ratio (FAR) in a combustor or flame zone using a Fourier-based flame ionization probe is presented. The use of multiple excitation frequencies and its detection at certain frequencies or combinations of harmonics of those excitation frequencies, namely, the inter-modulation distortion, provides a novel means of extracting a high signal-to-noise ratio (SNR) FAR measurement in a combustor.

13 Claims, 13 Drawing Sheets

(56) References Cited

OTHER PUBLICATIONS

J. Kojima, Q.V. Nguyen, "Measurement and simulation of spontaneous Raman scattering in high-pressure fuel-rich H2—air flames," Measurement Science and Technology, vol. 13, No. 3, 2004.

M. Allen, R.D. Howe, R.K. Hanson, "Digital imaging of reaction zones in hydrocarbon—air flames using planar laser-Induced fluorescence of CH and C2" Optics Letters, vol. 11, Issue 3, pp. 126-128, 1986.

I. Andersson, "Cylinder Pressure and Ionization Current Modeling for Spark Ignited Engines," Department of Electrical Engineering, Linkopings Universitet, Sweden, ISBN 91-7373-379-2 ISSN 0280-7971, 2002.

M. Kiefer, U. Maas, S. Park, X. Pian, G. Kollmann, G. O. Loohuis, D. Leerkes, H. Kalk, D. Markus, T. Langer "Combustion Control Based Flame Ionization," 25th World Gas Conference (Jun. 4-8, 2012, Kuala Lumpur), 2012.

P. Filipek, "Estimating air-fuel mixture composition in the fuel injection control process in an SI engine using ionization signal in the combustion chamber," Eksplotacja i Niezawodnosc—Maintenance and Reliability 2013; 15(3):259-265.

J. Kim, Development and experimental analysis of a micro-flame ionization detector for portable gas chromatographs, Ph.D. Dissertation, Mechanical Engineering, University of Illinois, Urbana-Champaign, 2013.

M. Naslund, "Combustion control in domestic gas appliances—fuel gases containing hydrogen," Project Report for Danish Gas Technology Center, ISBN 978-87-7795-380-4, 2014.

H. F. Calcote, "Ion and electron profiles in flames," 9th Symposium (International) on Combustion, 1963.

A. Saitzko, R. Reinmann, T. Berglind, and M. Glavmo, "An ionization equilibrium analysis of the spark plug as an ionization sensor," SAE paper No. 960337, 1996.

S. Yoshiyama, E. Tomita, and Y. Hamamoto, "Fundamental study on combustion diagnostics using a spark plug as ion probe," SAE 2000-01-2828, 2000.

A. Migoun, A. Chernukho, T. Noch, A. Cenian "Kinetics of ion formation in gasoline flames of internal combustion engines—numerical investigation," 22nd ICDRS, Minsk, Belarus, Jul. 27-32, 2009.

EP3124866, Pirovano.

\* cited by examiner

Fig. 2: Example FFT with 1 kHz and 5 kHz excitation, note lack of even harmonics in no flame case.

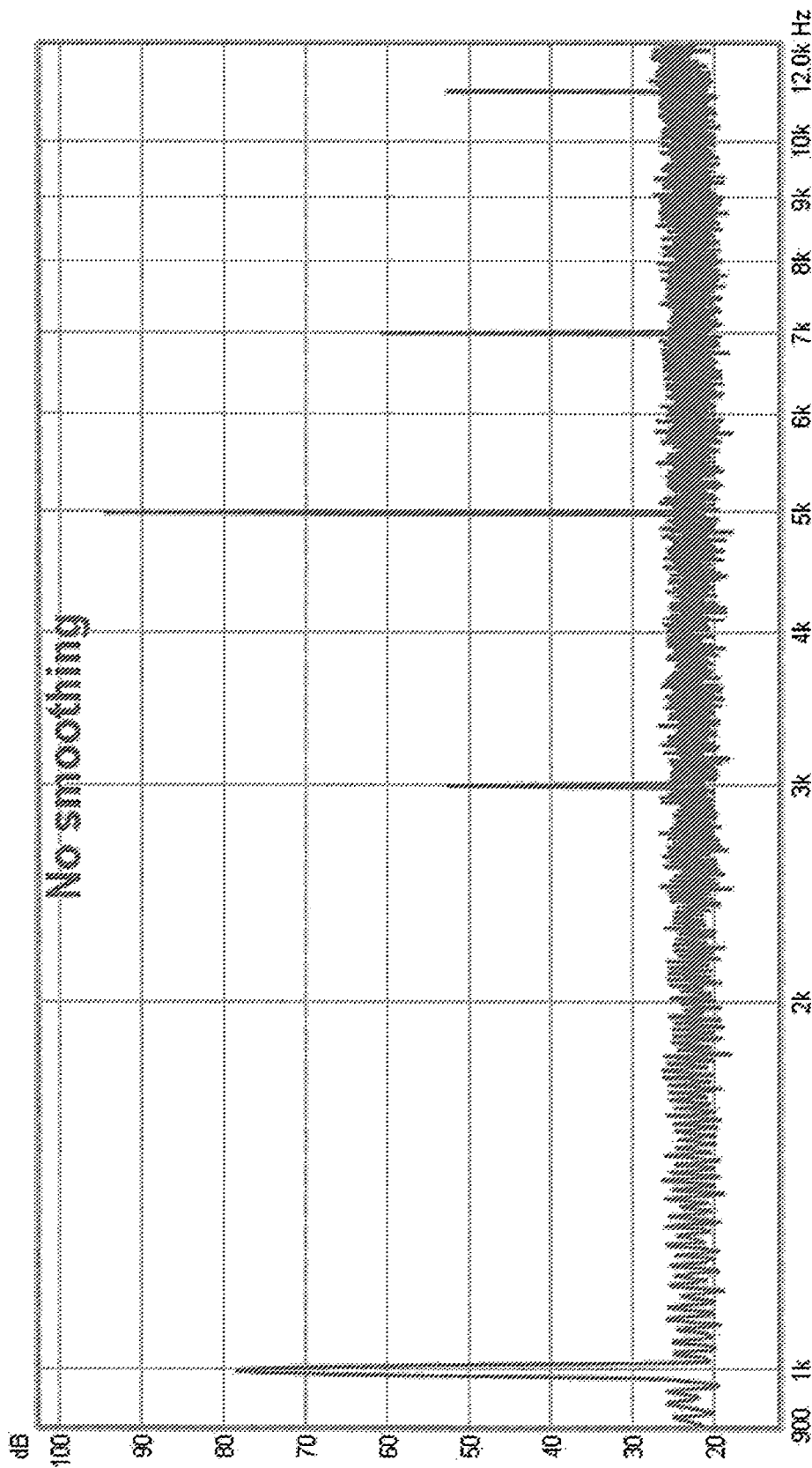
Fig. 6: Example FFT with 1 kHz and 5 kHz excitation in natural gas-air flame with flame off, notice lack of even order harmonics.

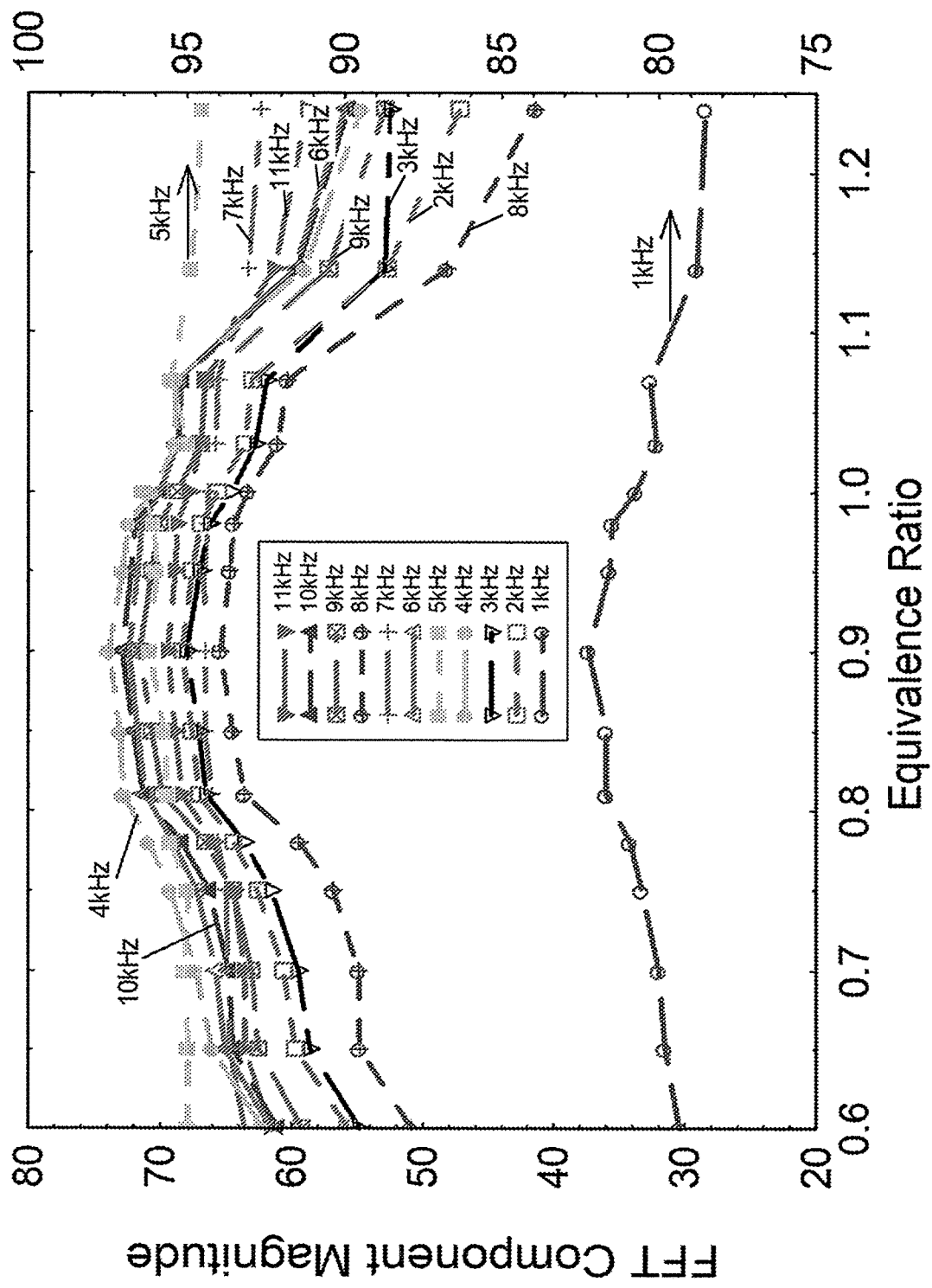
Fig. 7: Variation of all FFT components from 1 kHz to 11 kHz as function of equivalence ratio in natural gas-air flame

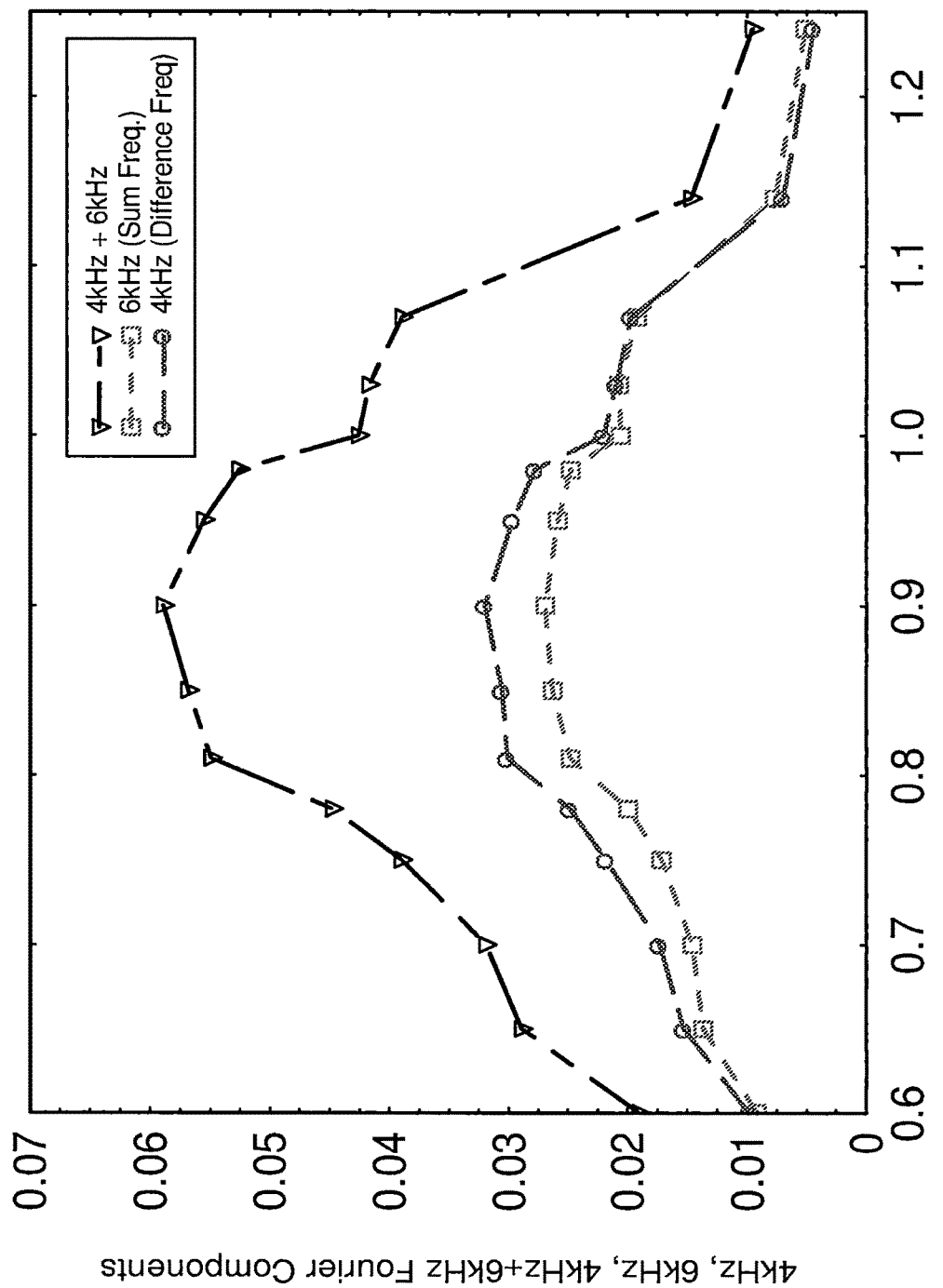
Fig 8: Variation of FFT components corresponding to sum and difference frequency between 1 kHz and 5 kHz excitation in natural gas-air flame

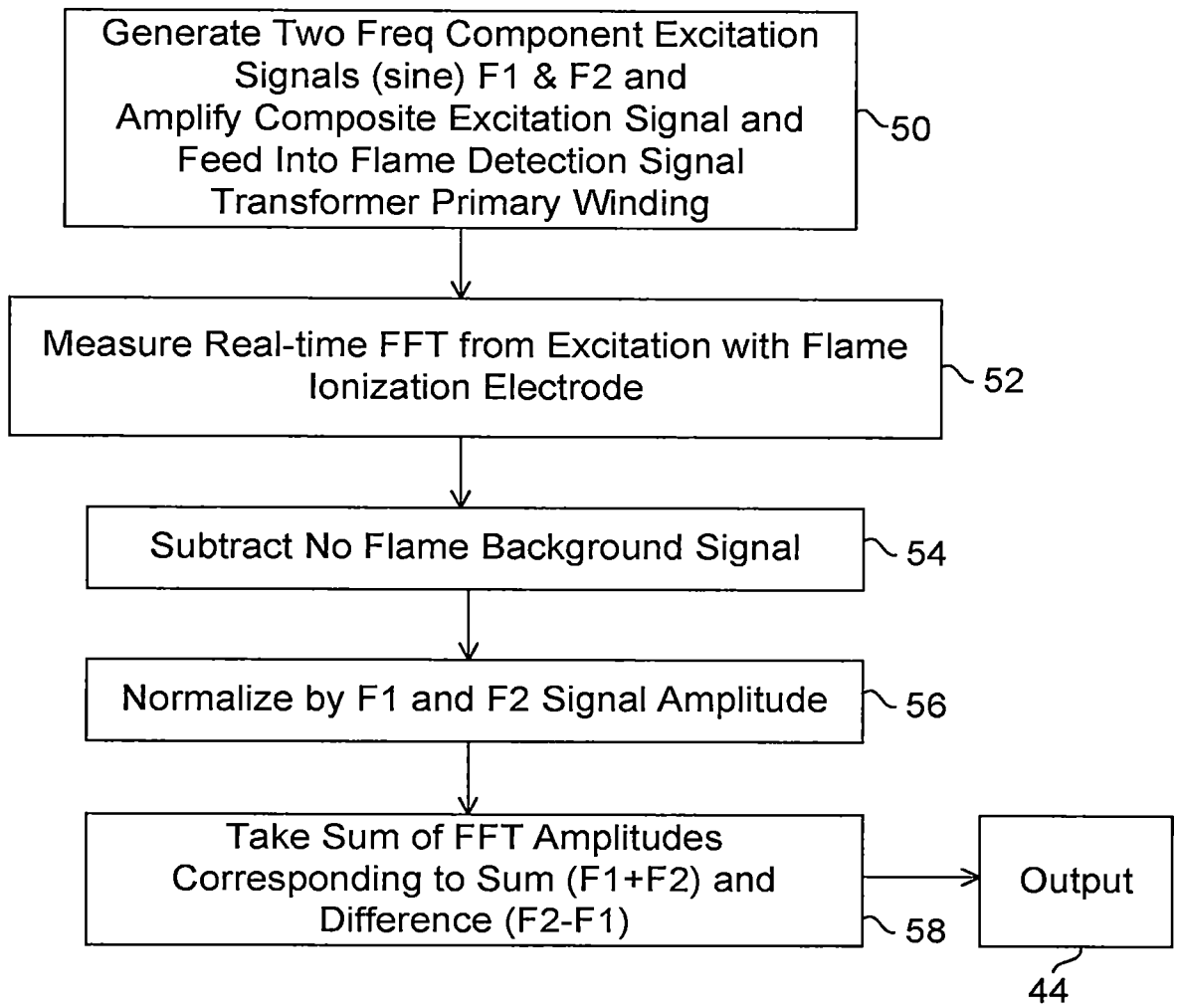
Fig. 9 System Flow Chart Diagram

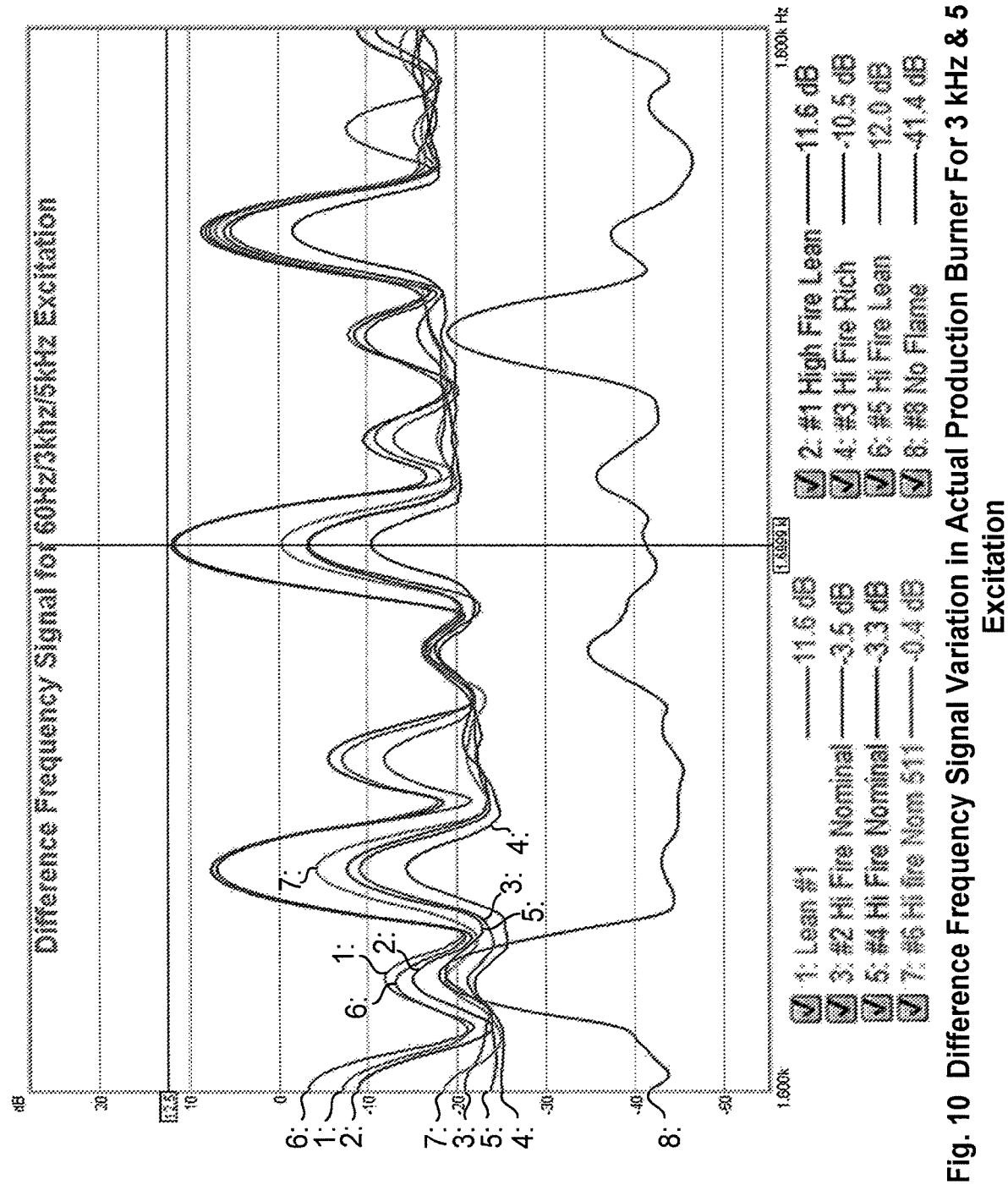
Fig. 10 Difference Frequency Signal Variation in Actual Production Burner For 3 kHz & 5 kHz Excitation

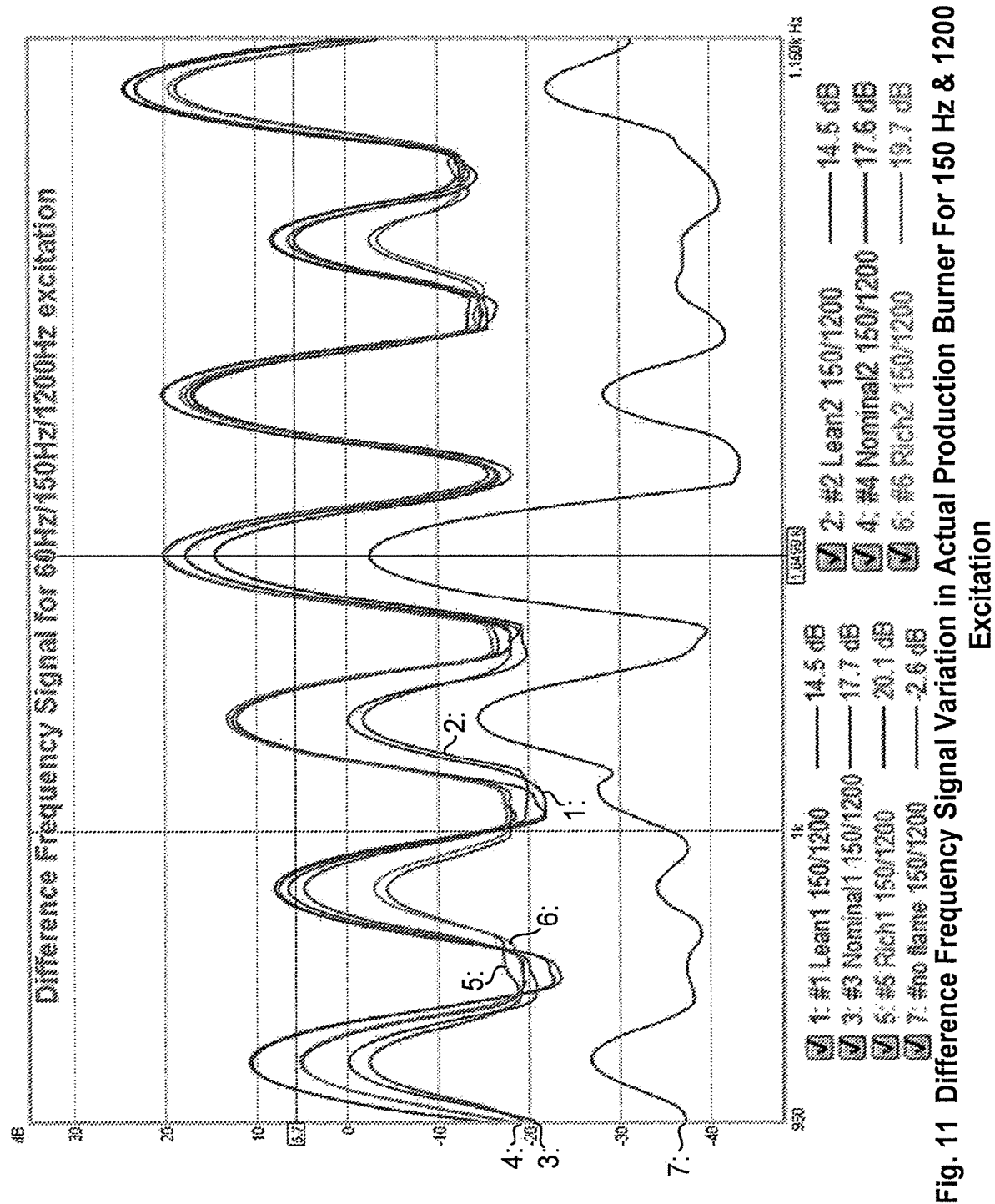
Fig. 11 Difference Frequency Signal Variation in Actual Production Burner For 150 Hz & 1200 Hz Excitation

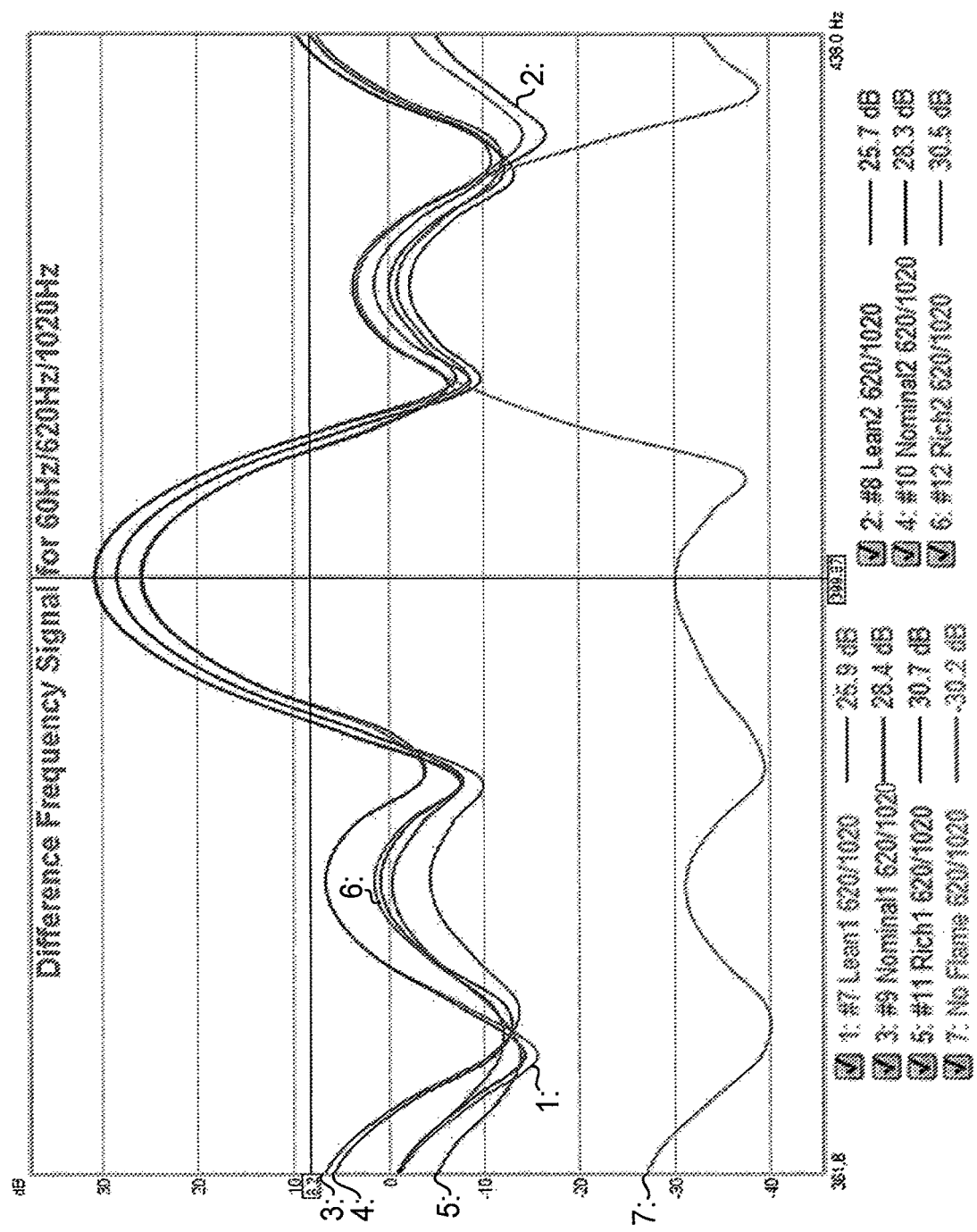
Fig. 12 Difference Frequency Signal Variation in Actual Production Burner For 620 Hz & 1020 Hz Excitation

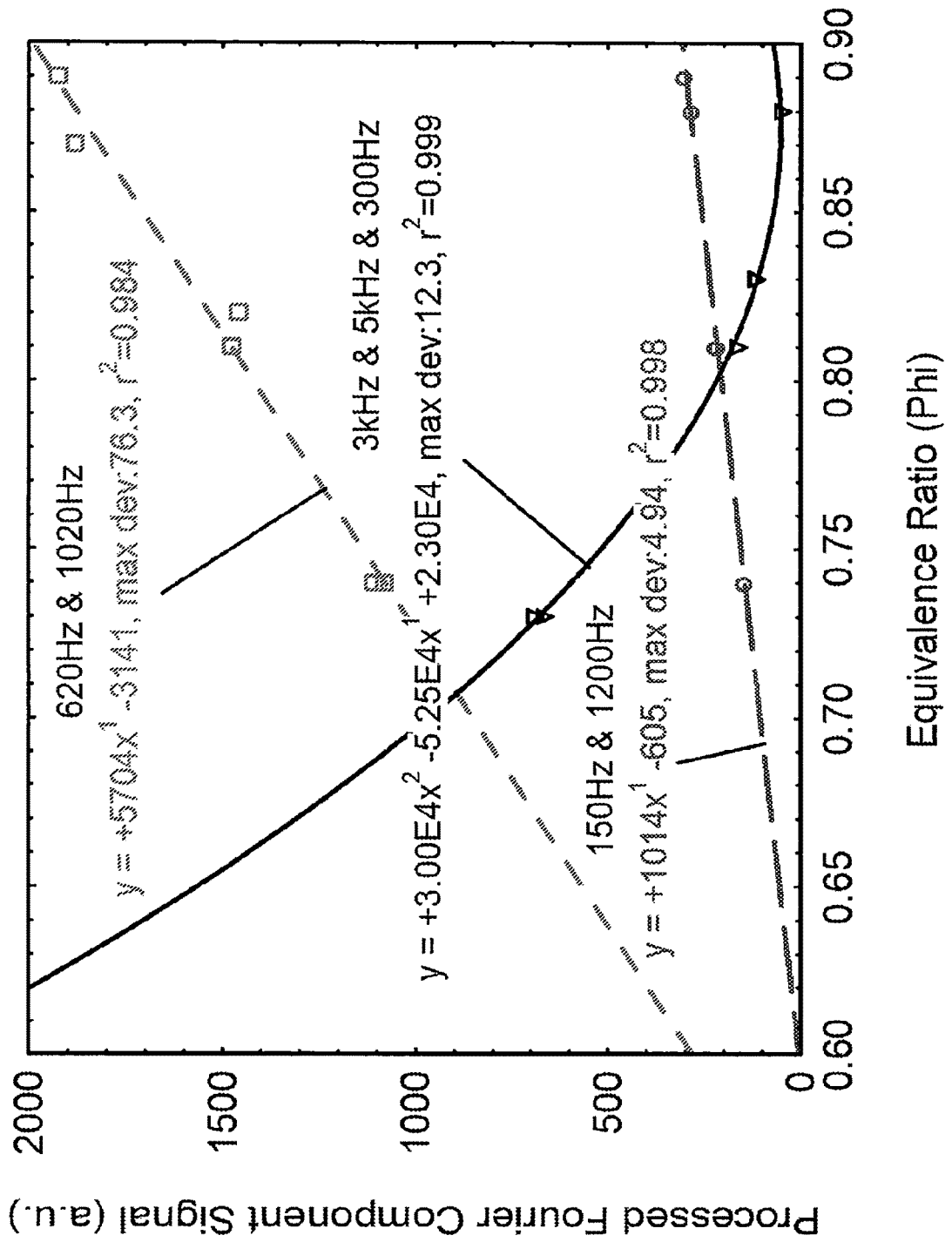
Fig. 13 Variation of Difference Frequency Signal as Function of Phi in Actual Production Burner for Various Excitation Frequencies

IN SITU FUEL-TO-AIR RATIO (FAR) SENSOR FOR COMBUSTION USING A FOURIER BASED FLAME IONIZATION PROBE

BACKGROUND OF THE INVENTION

1. The Field of the Invention

This invention relates to a method of detecting the fuel-to-air ratio (FAR) in a burner of a heating device using a single sensor. More specifically, this invention relates to the use of a frequency-domain characterization of the time-varying changes to the FAR.

In the general scope combustion systems, more specifically, combustion chambers in forced-air hydrocarbon fueled furnaces, boilers, water heaters, there exists a need to monitor and accurately control the FAR of the combustion process as the FAR is a critical parameter combustion efficiency, low gaseous emissions, and flame instability, in lean premixed combustion systems such as those found in furnaces, boilers, power utility generation system, etc., which use natural gas or other hydrocarbon fueled forced-air type combustion systems. Even more specifically, the subject combustion system demonstrated in this disclosure is an on-demand hot water heater system running on natural gas. Due to variations in the constituents of natural gas due to locality variations and temporal variability of the natural gas, optimum combustor efficiency and low gaseous pollutant emissions are not always guaranteed using an open-loop (typically mechanically fixed set point) FAR throttle control. The objective of this invention is develop a robust in-situ fuel to air ratio sensor that can measure the local FAR inside a combustion chamber using existing hardware or a minimum of new electrode probe penetrations into the combustion chamber. By using the existing flame ionization probe already installed in the existing burner, a novel means of extracting the FAR as a monotonic function on the fuel-lean or fuel-rich side of the combustion stoichiometry can be obtained without incurring added costs of a new sensor or redesign of the combustion chamber. This permits the use as a retrofitted sensor in existing systems by the addition of new electronics external to the combustion chamber. A goal is to provide a linear signal proportional to the FAR within a closed-loop feedback control system. It is further the object of this invention to provide a high signal-to-noise ratio (SNR) signal that is proportional to the FAR in the flame over a wide range of operating conditions and different hydrocarbon based fuels such as natural gas, propane, methane, or even butane.

2. Background Art

It is challenging to measure the FAR ratio accurately in a live flame burning inside the harsh conditions of a combustion chamber with limited access for sensors and probes. The high temperatures, thermal cycling, soot contamination, changes in fuel composition, and constantly changing on-demand hot water usage patterns, all pose an almost insurmountable obstacle, that for many years, has not found a satisfactory solution that is robust, cost-effective, and easy to use for an industrial or domestic appliance application. Perhaps the single most challenging characteristic of the problem to be solved lies in identifying a quantity that can be measured and a quantity that is proportional to the FAR in the flame without requiring the addition of a new type of sensor or penetrations of new probes in an existing system. The addition of new sensor hardware in the combustion chamber requires major modifications and substantial re-engineering costs to be realized. Furthermore, re-tooling of existing mechanical combustion related hardware will impact production and incur large capital equipment costs. Conversely, smaller changes or modifications to the electronics of a device that is already used to measure the presence of a flame for safety reasons, e.g., a flame ionization probe, in an on-demand hot water heater, can be done much more cost-effectively and quickly.

Previous attempts to measure the FAR inside a flame have been performed numerous times and with many different techniques ranging from optical methods, e.g., line of sight optical absorption of hydrocarbon molecules by the 3.39 micrometer HeNe laser wavelength (Girard et al., 2001 and Nguyen et al. 2002), tunable diode laser spectroscopy (TDLS) (Silver et al. 2002), spontaneous laser Raman scattering (Kojima and Nguyen, 2008), laser-induced fluorescence (Allen et al., 1986), etc. These methods all require optical access, and are complex, expensive, and limited to research burners in universities or major laboratories. Measurements of combustion stoichiometry in the post flame region can readily be performed using extractive gas sampling to measure $O_2$ and $CO_2$ and CO measurements using a combination of electrochemical cells, and/or non-dispersive infrared absorption (NDIR) methods as performed on industrial or utility boilers, or just $O_2$ electrochemical sensors which is routinely done in automotive engines. Numerous examples of extractive suction probe measurements in post combustion gases can be found and will not be listed here. There has been prior work on the use of a passive flame ionization probe as a sensor for FAR in a combustion chamber or flame, where the flame ionization current was passively measured as a function of fixed DC voltage bias. These include the works by: Andersson (2002), Kiefer et al. (2012), Filipek (2013), Kim (2103), and Naslund (2014). More recently, the work by Pirovano et al. (2017). indicated that actively modulating the voltage bias by applying an impulse function, and measuring the temporal decay time of the resulting ionization flame probe signal would provide a means of measuring the FAR in a flame. However, none of the above studies show a feasible way to robustly measure the FAR in a closed chamber industrial burner with sufficient details to show that the measurement is linear and monotonic.

The prior art systems that use optical methods are complex and costly, and cannot be made robust or cost-effective for use in an appliance-centric system. With the exception of the work by Girard et al. (2001) where a kHz sampling rate was obtained using a very small volume optical absorption probe, prior art methods that use extractive gas or post-combustion oxygen or $CO_2$ sampling methods require several minutes to sample and do not measure the in-situ FAR in the flame quickly enough for an active feedback and control system. With the exception of the method disclosed in European Patent Publication EP3124866 of Pirovano, prior art methods that use flame ionization currents have not, in general, shown a reliable and foolproof method for the measurement of the flame FAR that is applicable to use in non-research commercial appliances. The method described in Pirovano, teaches that the flame ionization signal, when excited by an external electrical impulse (a brief step function in the positive and negative direction) imposed onto the flame ionization sensor electrode that produces a flame ionization signal with an exponential decay time constants (in the positive and negative directions) that can be related to the FAR in the flame over a range of operating conditions.

However, Pirovano fails to disclose at what frequencies or absolute time constants are used. Furthermore, the disadvantage of having to extract a time decay constant is that it can be affected by changes in cable or system electrode capacitances, or the system capacitances can be so large as to overcome the very brief temporal decay time constants that would need to be resolved in order to extract gas-phase species information that is proportional to the electrically charged ions collisional de-excitation lifetimes (of order 1 ns to 10 ns or circa 1 GHz to 100 MHz according to gas kinetic theory for number of collisions at flame temperatures).

SUMMARY OF THE INVENTION

In accordance with the present invention, there is provided an existing flame ionization sensor electrode inside a combustion chamber which is connected to a standard flame detection circuit which utilizes a step up isolation transformer to inject a plurality of excitation waveforms onto the electrical circuit comprised of a flame ionization electrode, a ground electrode and a flame detection circuitry with the electrodes disposed in a flame plasma. The flame detection circuitry is modified to accept an external waveform generator that provides at least two excitation waveforms at two separate frequencies. These excitation waveforms induce a voltage in the sensor electrodes, which in the presence of a flame plasma, conduct electrical current through the electrode-to-ground gap. This electrical current flow through a current sensing electrode is detected and amplified and fed to an analog to digital converter. The digitized signal is then processed in the frequency domain using standard fast Fourier transform (FFT) methods. The resulting Fourier frequency components corresponding to various combinations of excitation frequencies and their harmonics are then processed in an algorithm that utilizes the fact that even order harmonics of the sum-frequency and difference-frequency of the excitation frequencies produces a signal that is monotonically dependent on the FAR. This signal was observed to be independent of the composition of the combustion gases relative to collisional quenching partners which may alter the value of the flame ionization signal, when not accounted for. It was observed that when a difference-frequency and sum-frequency Fourier components from the original two excitation frequencies are used, the resulting signal appears to be monotonic and independent of other factors such as flame bulk velocity or collisional collider species since both affect flame ionization signal at two separate frequencies in the same way, hence are common mode and naturally subtracted from the derived signal used for determining the FAR.

In one embodiment, the present sensor system includes a secondary separate electrode to detect the modulated flame ionization current. In another embodiment, a plurality (>2) of flame ionization electrodes may be utilized to spatially average out the variations inside the combustor. In yet another embodiment, the two excitation frequencies can be effected by 3 or more excitation frequencies. And yet in another embodiment, the excitation frequencies can be another type of waveform and not limited to sinusoidal (square, triangle, etc.).

An object of the present invention is to provide an in situ measurement of the time-varying fuel to air ratio (FAR) of a flame inside a combustor during operation.

Another object of the present invention is to provide a measurement of FAR as a function of time for the purposes of combustor health monitoring, and/or combustor closed loop feedback control systems. The use of a signal that monotonically varies over the range of FAR encountered in a combustor is sufficient for the system to be able to control the FAR in an active way.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 depicts an example FFT with 1 kHz and 5 kHz excitation in natural gas-air flame with flame off, notice lack of even order harmonics.

FIG. 7 depicts a variation of all FFT components from 1 kHz to 11 kHz as a function of equivalence ratio in natural gas-air flame. Each curve represents the variation of a single Fourier frequency component from the FFT ranging from 1 kHz to 11 kHz (at 1 kHz steps).

FIG. 8 depicts a variation of FFT components corresponding to sum and difference frequency between 1 kHz and 5 kHz excitation in natural gas-air flame.

FIG. 9 is a system flow chart diagram.

FIG. 10 depicts a difference frequency signal variation in a production burner for 3 kHz and 5 kHz excitation.

FIG. 11 depicts a difference frequency signal variation in a production burner for 150 Hz and 1200 Hz excitation.

FIG. 12 depicts a difference frequency signal variation in a production burner for 620 Hz and 1020 Hz excitation.

FIG. 13 depicts a variation of difference frequency signal as a function of phi in a production burner for various excitation frequencies.

PARTS LIST

Figure 1:
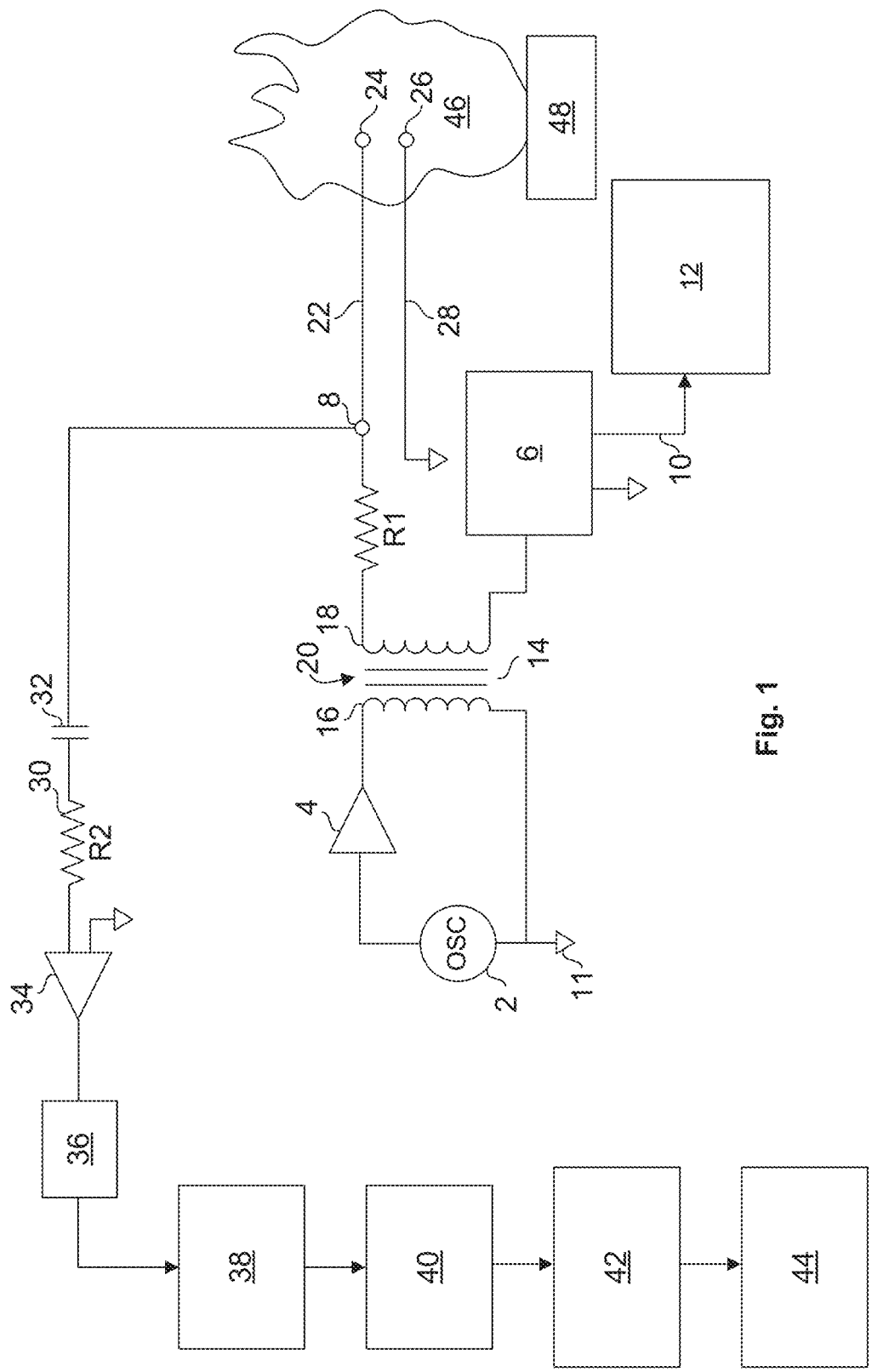
FIG. 1 is a block diagram of Fourier frequency method of determining fuel to air ratio in a combustion system using a flame ionization probe.

2—function generator
4—voltage amplifier

6—flame detection circuit
8—tap point
10—signal
12—controller board
14—step-up isolation transformer
16—primary windings
18—secondary windings
20—magnetic steel core plates
22—flame ionization probe
24—tip of probe
26—tip of ground electrode
28—ground electrode
30—resistor
32—film capacitor
34—preamplifier
36—analog to digital converter (ADC)
38—FFT processor
40—FFT coefficients
42—post processing algorithm
44—equivalence ratio
46—flame zone
48—burner
50—step
52—step
54—step
58—step

PARTICULAR ADVANTAGES OF THE INVENTION

The proposed in situ fuel-to-air ratio (FAR) sensor uses a Fourier based flame ionization probe that operates in the acoustic frequency domain and is possible through a frequency mixing and detection method, with the flame plasma serving as the "detector" element that generates the even-order harmonic distortion components which result from a wave-mixing of two or more excitation frequencies. By using frequency based phase-sensitive detection in Fourier-space, the large noise sources at DC levels to 100 Hz are effectively suppressed for higher signal to noise ratios. The difference frequency and sum frequency components of the excitation frequencies, also sometimes known as the inter-modulation distortion (IMD), are highly linear and proportional to the fuel to air ratio (FAR), also known as the equivalence ratio (Phi). The turbulence in the combustor that would otherwise "wash out" the usual variations in the DC-level flame ionization signal does not appear to cause a problem with signal contrast or linearity when looking at difference frequency generation between the excitation frequencies.

A robust signal proportional to the FAR can be produced from an existing set of electrodes already in place in most combustion systems that have a flame ionization sensor electrode. The proposed sensor system produces a high signal to noise ratio signal that is near real-time (circa 0.5 seconds) and suitable for feedback closed loop control. The resulting closed loop flame control system then permits reliable, clean, and efficient burner operation over a wider range of fuels and automatically self-adjusts for variations in combustion system mechanical wear and tear. Furthermore, the active control may allow the combustion system to traverse from low to high and high to low firing rates with a minimal amount of combustion instability due to acoustic processes. The system can be implemented in a cost effective manner by the addition of a digital signal processor (DSP), high voltage op amp integrated circuit (IC), and analog-to-digital converter/digital-to-analog converter (ADC/DAC) ICs into an existing combustion controller motherboard via and sub circuit riser mezzanine board, or a separate smaller FAR sensor board that is externally mounted.

The use of multiple excitation frequencies and detection of the difference frequency mixing of the signal arising from the flame-generated second order harmonic distortion and its relationship to the FAR is the critical new concept.

The test data are provided in FIGS. 3 to 14, but not including FIG. 10. Sources of error are discussed elsewhere herein and mainly result from variations of the plasma velocity in the flame zone. As combustion firing rates and turbulence modify the velocity in a combustor drastically, to have the frequency difference flame ionization signal not be susceptible to the velocity errors is significant.

In one embodiment, the proposed new flame sensor system produces a signal that is linearly proportional to the FAR with a 0.999 goodness-of-fit over the fuel-lean side of operation, and the SNR and dynamic range appears to be in excess of 22 dB, with a repeatability of better than 2% of full scale (when traversing between different equivalence ratios in the range of 0.74 to 0.89, and returning to the previously set value as measured with a downstream combustion gaseous emissions analyzer). The time response is in the range of 0.5 seconds to 5 seconds depending on the level of time averaging, with the above SNR and repeatability for FFT samples of 4 k points with 44 kHz data sample rate provides a 2.8 second time response constant.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The present invention serves to provide a real time measurement of the fuel to air ratio for closed loop combustion control in a premixed combustion system or burner by first establishing a relationship between inter-modulation distortion amplitude and fuel-to-air ratio (FAR) of a fuel and air combustion system having a combustion chamber. The invention utilizes Fourier spectral detection methods by amplitude modulation of the electrical current that is used to excite a flame detection ionization sensor probe, and frequency responses are received by peripheral Fast Fourier Transform (FFT) electronics and software located outside of the combustion zone in order to effect the measurement of the FAR.

FIG. 1 shows a block diagram of the present FAR sensor system. The key components and the function are as follows. A function generator 2 produces sine waves at a plurality of frequencies (F1, F2, F3, etc.). These multiple sine waves are then fed into a moderate voltage amplifier 4 (up to +/−50 V peak-to-peak) having an output that is then fed into a step-up isolation transformer 14 having primary windings 16, secondary windings 18, and a magnetic steel core plate 20 to effect a step-up of the high impedance sinusoidal excitation signal. The galvanically-isolated excitation signal from the transformer secondary windings 18 is then sent through a 300 kOhm current sense resistor to the flame ionization probe 22. Each of the tip 24 of the probe 34 and the tip 26 of the ground electrode 28 is disposed in the flame zone 46

(flame plasma) associated with a burner 48. When a flame is present, the ions surrounding the electrodes conduct electric current in one direction, effectively serving as a flame-properties dependent diode between the electrodes 22 and 28. This causes a direct current (DC) to flow across the current sense resistor, completing the loop through the inductor secondary windings 18. This current is finally sensed with a low voltage comparator operational amplifier circuit in the flame detection circuit 6. The flame detection circuit 6 provides a definitive signal 10 to the combustion system main controller board 12 operation and control algorithm indicating that a flame is lit and active. During normal operation of the flame detection circuit 6, a tap-point 8 disposed prior to the current sense resistor provides a readout node (indicated in volts) for the FAR system by first passing the signal through a 1 uF film capacitor 32 to AC couple the signal into the preamplifier 34 input of a digital audio interface. A 500 kOhm resistor 30 immediately after the coupling capacitor 32 is used to limit signal current flow, thereby reducing the effect of adding FAR diagnostic to the routine operation of the existing flame sensor system. The digitized output of the analog to digital converter (ADC) is then fed into an FFT processing unit, e.g., a computer or a dedicated real-time digital signal processor 38 (DSP) processor chip. The FFT coefficients 40 are extracted and then fed into a post processing algorithm 42 that is then used to determine the FAR or equivalence ratio 44.

Figure 2:
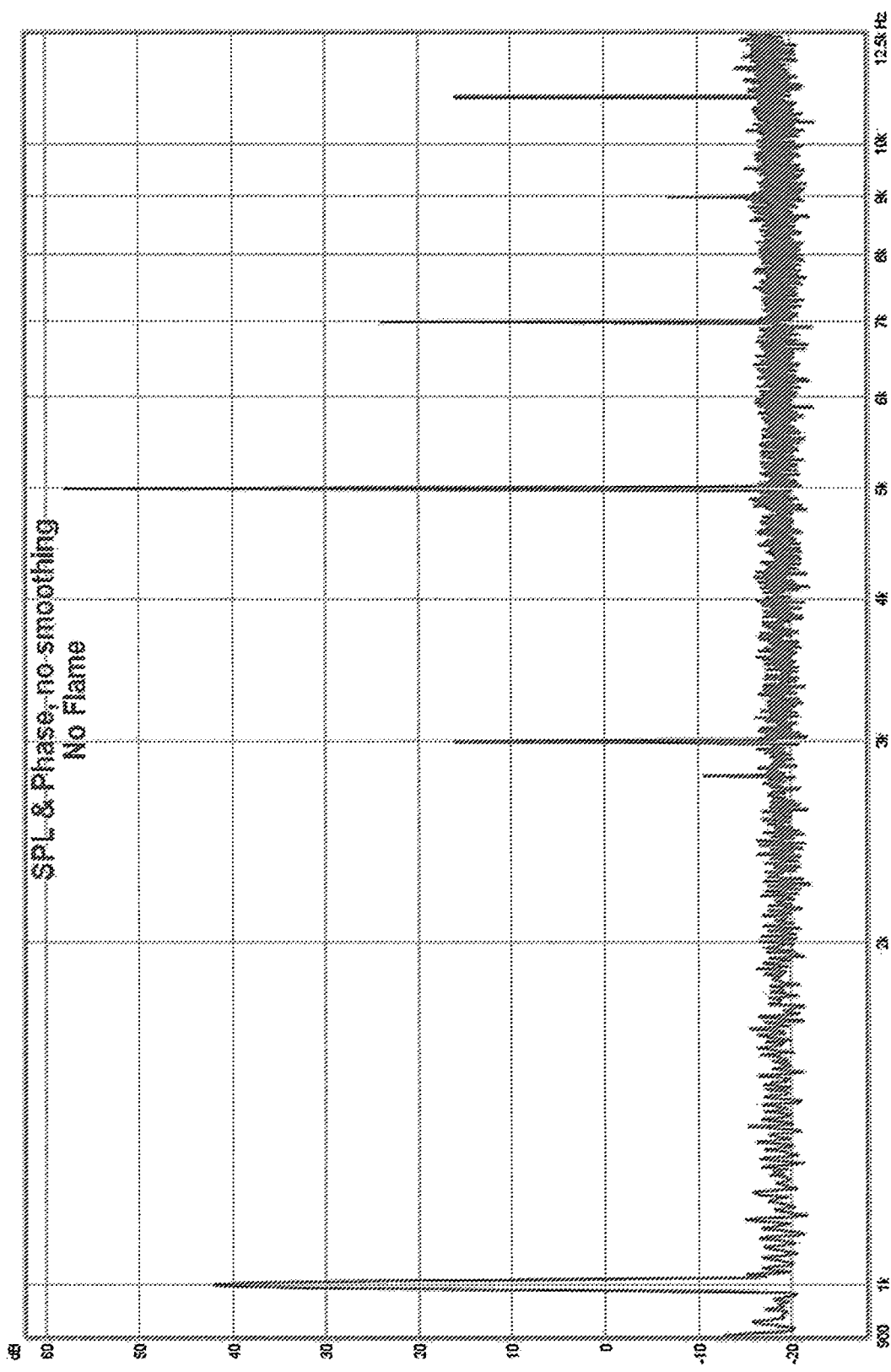
FIG. 2 depicts an example FFT with 1 kHz and 5 kHz excitation (note lack of even harmonics in a no flame case).
Figure 3:
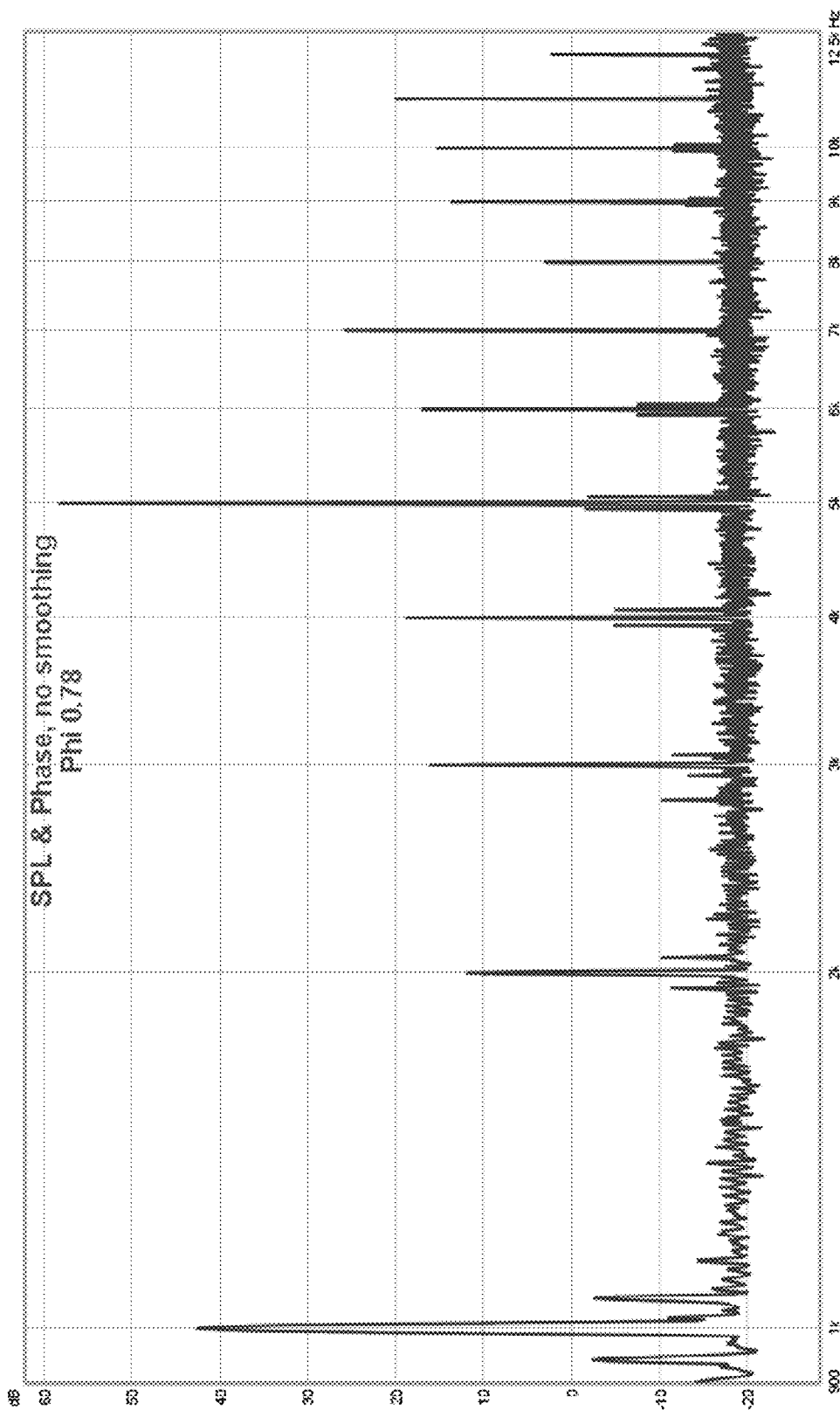
FIG. 3 depicts an example FFT with 1 kHz and 5 kHz excitation in propane-air flame with 0.78 equivalence ratio (note appearance of even harmonics).
Figure 4:
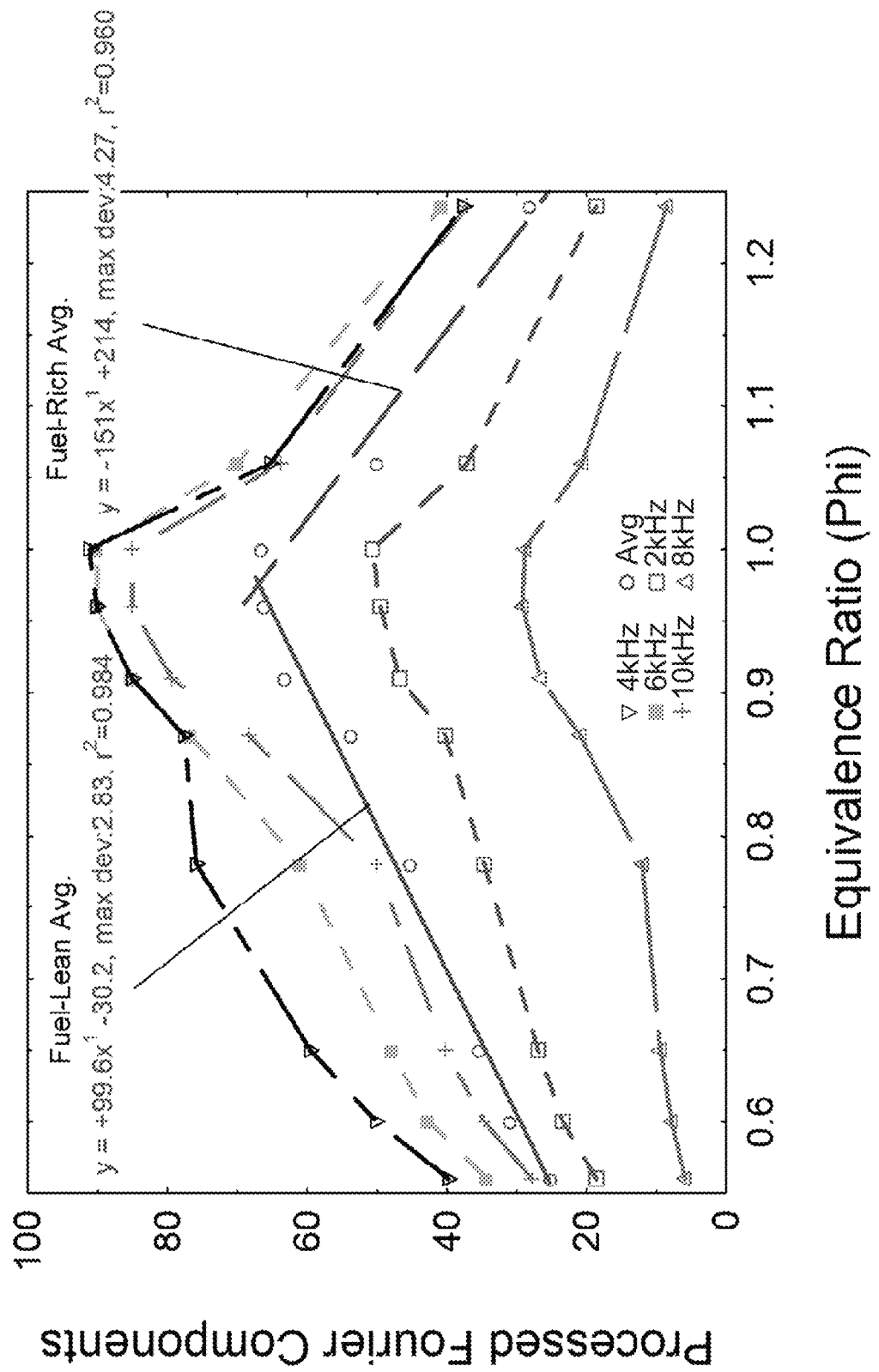
FIG. 4 depicts a variation of even order FFT terms as a function of flame equivalence ratio in propane-air flame with 1 kHz and 5 kHz excitation, showing linear variation of averaged even-order harmonics with equivalence ratio.

The FAR sensor system shown in FIG. 1 is implemented through the use of three additional electronic sub-systems: (1) an excitation oscillator 2 and amplifier 4 that provides multiple programmable sine waves at different frequencies; (2) a pre-amplifier 34 and ADC 36 to read the resulting AC modulated flame ionization signal and permit it to be processed; (3) a DSP 38 that is capable performing rapid fast Fourier transforms (FFTs) on the digitized signal. The resulting FFT coefficients 40 are then processed in an algorithm 42 that then produces a signal value 44 that is linearly proportional to the FAR. In operation, the excitation oscillator needs to be set to several frequencies (strategically chosen) to produce a linear and robust signal that can be used for determination of the FAR in real-time. Typically, two frequencies such as 3 kHz and 5 kHz are generated and fed into an amplifier capable of generating up to 50 V peak-peak sine waves with low distortion. This signal is then coupled into the primary side of the step-up isolation transformer 14 of the flame sensor circuit. As transformers have the property of inducing odd-order harmonic distortion, the FFT of the resulting flame ionization signal without a flame present shows odd order harmonics in addition to the excitation frequencies shown in FIG. 2. In the presence of a flame, in this case, a research propane-air flat flame supported on a porous ceramic matrix then produces even order harmonic distortion components as shown in FIG. 3. In FIG. 4, if all the even order harmonic FFT coefficients are normalized by the sum of the amplitudes of the excitation frequencies, and then added up and plotted as a function of the FAR (Phi), it shall be noted that there is a linear variation on both the fuel-lean side and fuel-rich side with a maximum at the stoichiometric value of Phi=1. The change in the slope can be used to determine if the burner is operating in the fuel-lean or fuel-rich zone.

Figure 5:
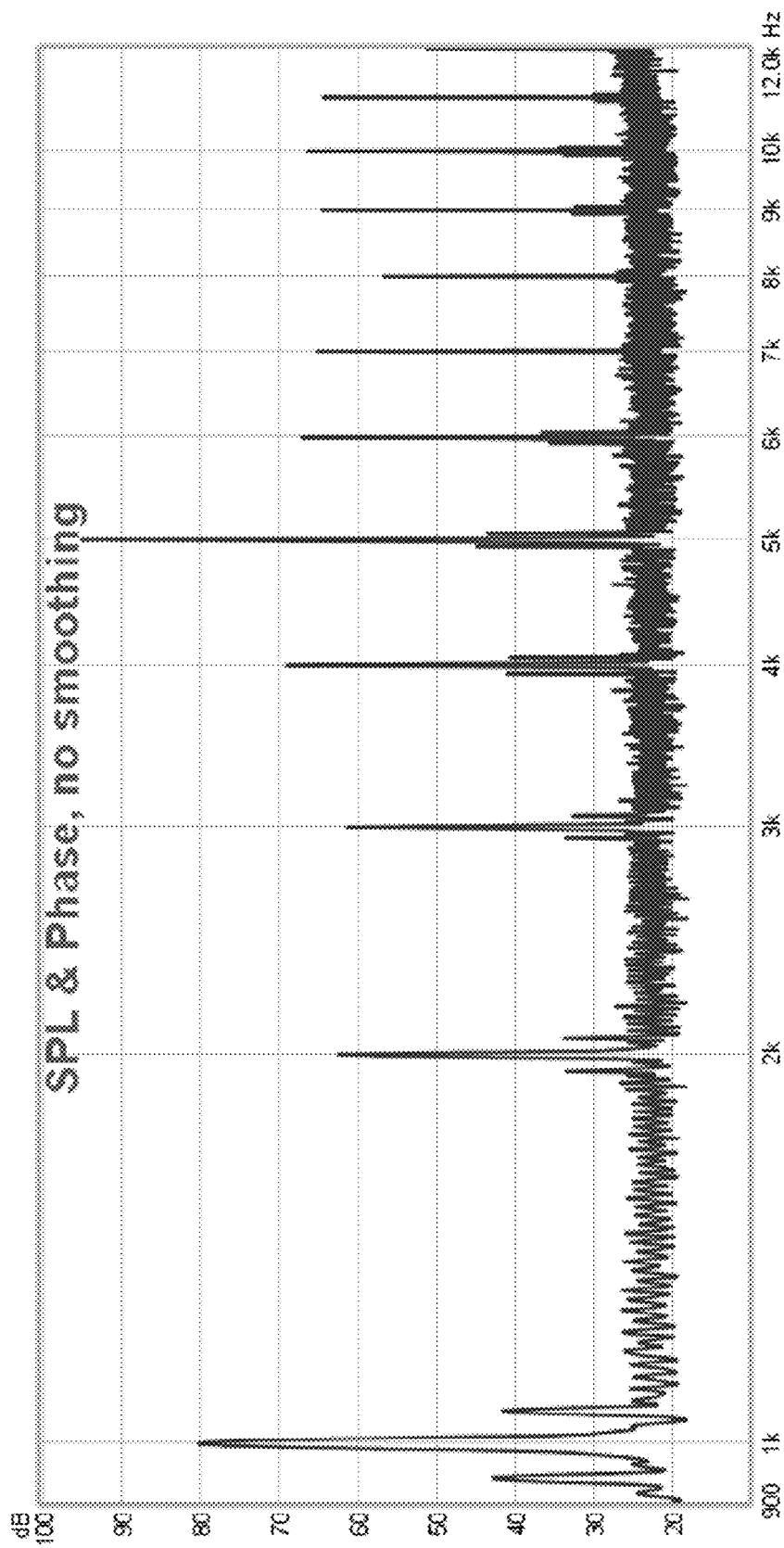
FIG. 5 depicts an example FFT with 1 kHz and 5 kHz excitation in natural gas-air flame with 0.75 equivalence ratio, note similarity to propane-air flame and appearance of even order harmonics.

FIG. 5 shows a similar spectrum as the spectrum shown in FIG. 3 but for natural gas flames above the same porous ceramic matrix burner, showing the presence of even order harmonic distortion components when the flames are present. FIG. 6 shows the same system as the one shown in FIG. 5 but with the flame turned off so that now there are only odd order harmonic distortion components. Clearly, the presence of the even order components and their amplitude are related to the existence of a flame, but more than that, FIG. 7 shows that the relationship is monotonically varying on either the fuel-lean side or fuel-rich side of the flame. In FIG. 7, each curve represents a single Fourier component, ranging from 1 kHz to 11 kHz (in 1 kHz steps), and are plotted as a function of flame equivalence ratio Phi for the case of 1 kHz and 5 kHz excitation frequencies applied to the flame ionization electrode. If an increase of contrast or an enhancement in sensitivity of the resulting FFT coefficients with respect to the FAR is desired, one can look at the difference-frequencies and sum-frequencies between 5 kHz and 1 kHz (4 kHz and 6 kHz), and if one takes the sum of these, an improved sensitivity of the signal as a function of FAR can be obtained. In FIG. 8, the curves represent the difference (4 kHz) and sum (6 kHz) of the Fourier components, and their combined value, normalized by the sum of the amplitudes of the two excitation frequencies. The normalization step provides a means of accounting for the variations in the excitation frequency amplitude as a function of time. In cases where the excitation signal amplitudes are steady or fixed with a high level of stability, the normalization step may not be needed. Based on FIG. 8, it can then be summarized in FIG. 9 the steps needed to generate the signal shown in FIG. 8. Briefly, the steps shown in FIG. 9 include: (a) generating two excitation frequency components at preferably odd values (e.g., about 1 kHz and about 5 kHz, or about 3 kHz and about 5 kHz) so that their sum or difference is an even order harmonic which is then easily detectable in the presence of odd-order harmonic noise and amplifying the composite dual excitation frequency signal with a high voltage operational amplifier 4 shown in FIG. 1 to achieve between about +/−20 v to about +/−50 v signal and feed the signal into primary windings of the flame ionization detector in a flame region of a combustion chamber as in step 50; (b) upon measuring the A.C. modulated flame ionization signal from the probe 22 (see FIG. 1), calculating the Fourier frequency components 40 (see FIG. 1) using the FFT processor 38 as in step 52; (c) in the post processing algorithm 42 (see FIG. 1), subtracting the no flame background signal for each Fourier component as in step 54; then (d) normalizing by the sum of the amplitudes of the Fourier components of the excitation frequencies F1 and F2, as shown in step 56; and (e) taking the combined sum of the amplitudes of the Fourier components at the difference-frequency and sum-frequency components of the excitation frequency components as shown in step 58. This then produces a value that is linearly proportional to the FAR or Phi, which represents the output 44 (see FIG. 1) of the sensor system. In one embodiment, step 56 is not performed if the amplitudes of the excitation frequencies F1 and F2 are steady or constant, an example of which is shown in FIG. 13.

The above functional steps and processes work well in a steady flat flame research burner in a lab using propane and natural gas. Experiments performed using high purity methane also resulted in similar measurements. Note that for all the laboratory flat porous ceramic burner experiments, a separate electrode, provided by the spark ignitor, was used as the readout sensor electrode which was directly connected to the ADC preamplifier without any additional components. However, for the production burner, this could not be used as the spark ignitor electrode was needed to ignite the flame and is connected to a HV spark system that would destroy the sensitive FFT electronics if co-mingled on the same electrode. Thus, for the measurements of this sensor system in a production burner, the FFT readout had to be connected to the electrical tap point 8 as shown in FIG. 1, and then provided with a 1 uF film capacitor and 500 kOhm resistor to isolate the flame detection circuitry from the FAR detection electronics, which would otherwise, interfere with the DC flame ionization current required for operation of the burner's automatic safety shutdown processes. In a production burner with the flame detection electrode also serving as the FAR sensing electrode, a large amount of electrical noise from the combustion controller motherboard and electrical mains noise (at 60 Hz in the U.S.) is injected onto the very sensitive preamplifier of the ADC unit. In addition, the production burner is enclosed and highly turbulent as opposed to laminar flow as in a laboratory porous ceramic matrix flame burner. The main result of using the FAR sensor electrode in this configuration was that the previously clearly varying signals at the sum and difference frequencies are now buried in more noise and rather invariant with changes to the burner operating characteristics such as FAR or firing rate. This is caused partly by the fact that the flame ionization signal is dependent not only on ions and charged particle number density in the flame, but also their velocity (due to turbulent motion) and their quenching environment. That is, the charged particles are sometimes neutralized via energetic chemical reactions with other species.

In the presence of turbulence, it was discovered that the FAR variation can still be extracted from the FFT spectral data. It was observed that a clear linear and monotonic relationship between the FAR and the signal resulting from the compound difference frequency signal between 5 kHz and 3 kHz (i.e., 5 kHz–3 kHz=2 kHz) and 300 Hz, which results in a readout frequency of 1700 Hz. The 300 Hz signal results from the 5th harmonic of the very strong mains A.C. 60 Hz noise content in the signal. FIG. 10 shows the variation in this signal when readout is at 1700 Hz. The curves each at the lean (traces 1, 2, 6), and nominal (traces 3, 5) settings, lie substantially on top of one another, demonstrates the excellent repeatability of the measurement technique. It shall be noted that the high fire fuel rich case (or trace 4) also demonstrated excellent repeatability. In FIG. 10, it shall be noted from trace 7 that with a higher blower motor setting (i.e., slightly off from the nominal setting to result in an increased fuel lean condition) that the trace is displaced slightly above the nominal curves. For the data presented in FIG. 10, the relationship between the FAR and signal amplitude is a monotonic negative slope as increasing FAR is equivalent to a decreasing signal. When fitted with a linear least squares fit versus the FAR (from the post combustion gas analyzer), the resulting difference signal shows an almost perfectly linear slope. The test was repeated with the excitation frequency changed to two other modes: 150 Hz/1200 Hz, and 620 Hz/1020 Hz (a low frequency excitation case and a moderate frequency excitation case) in order to explore the effects of using other frequencies and to find out whether the resulting signal derivation was still monotonic and/or linear. FIG. 11 shows the result of the 150 Hz/1200 Hz excitation in combination with the existing 60 Hz mains noise excitation with a readout frequency of 1050 Hz (i.e., 1200 Hz minus 150 Hz). FIG. 12 shows the result of a test essentially the same as that used to produce FIG. 11 but instead with 620 Hz/1020 Hz excitation frequency with a readout frequency of 400 Hz (i.e., 1020 Hz minus 620 Hz).

The results of all three different excitation and readout schemes are presented in FIG. 13. A linear least squares fit is disposed through each of the two direct difference frequency schemes (150 Hz/1200 Hz and 620 Hz/1020 Hz). A quadratic least squares fit is disposed through the third case in which a combination of three excitation frequencies (60 Hz/3 kHz/5 kHz) was used. It shall be noted that the curve represents the data points well with a negative slope. All the coefficients of goodness-of-fit are better than 0.99 and actually 0.999 in two of the three cases. This indicates that the behavior is linear for two excitation frequencies, and quadratic for triple excitation frequencies (5 kHz minus 2 kHz, minus 300 Hz). The 5th harmonic generation within the transformer from the 60 Hz mains present in the transformer gives rise to the strong 300 Hz component which is then frequency subtracted from the difference frequency of the two main excitation frequency. In one embodiment, the quadratic behavior can be approximated by a linear function on the fuel lean side with sufficient accuracy to be used for a closed loop combustion control system. In the case of a non-linear dependence of the output signal versus the FAR, as long as the dependence is monotonic, it can be used as a signal for closed loop feedback control. However, a linear signal is always preferred, if available. As shall be appreciated by practitioners in the controls and industrial automation industry, there are numerous examples where signals relied upon for controls may be non-linear (e.g., temperature dependence of thermistors, etc.), non-linearity of curves relied upon for controls are not problematic provided that they are monotonic.

Although the present invention is carried out with the setup shown in FIG. 1, alternate embodiments may include the use of a separate electrode that is independent of the flame detection system electrode, etc. Alternate embodiments could also utilize a plurality of electrodes arrayed in the chamber in order to spatially average the flame ionization signal. Yet another embodiment may have more than three excitation frequencies and may utilize more than two separate sum-frequency or difference-frequency excitation/detection schemes. A further alternate embodiment may utilize non-sinusoidal excitation waveforms (e.g., triangle, square, etc.).

The description of the flame ionization current has been developed and refined over many years. Currently, there are three key models that seem to be used by combustion technologists. These include the model presented by Calcote (1963) which considers charge transport processes to be important and requires that the charged particles physically touch the electrodes, the Reinmann model shown by Saitzko et al. (1996) which states that the current is detectable if a charge is moving inside the electric field produced by the electrodes, and that the charged particles need not actually touch the electrodes; and the model by Yoshiyama and Tomita (2000), which states that the electric current at the two electrodes need to be equal and is limited by the much slower positive ions in the flame. Measurements of the flame ionization current is then proportional to the number density of the ions or electrons, depending on which polarity one is looking at. The main chemical flame ions of interest and which are indicative of a combustion process are the HCO+, CH3O+ and H3O+ ions, are approximately linearly related to the equivalence ratio on the fuel-lean side (Migoun et al. 2009). The relationship between the flame ionization current and flame properties, as described by Calcote (1963) shows a dependence on the particle velocity or movement, and this makes the determination of the FAR problematic if the flow conditions cannot be de-coupled from the measurement. The flame ionization current is a function of the bias voltage, the spatial location of the electrode, the local plasma velocity, all of which are time variant due to turbulent flows and bulk motion.

The difference or sum frequency generation of the flame ionization current indicates a frequency electrical wave-mixing process that occurs due to the intermodulation distortion (IMD) that is generated in the flame plasma media itself as a result of the non-linear interaction of two or more electrical fields imposed by the different excitation frequencies. The physical manifestation of the IMD is analogous to the existence of a variable diode-junction that is created in the presence of a flame. This rectification process generates the even-order harmonic components, and from the observed response of the Fourier coefficients of either the difference or sum frequency components, it appears that the resultant IMD signal amplitude is monotonically proportional to the ion concentration. One possible explanation for the independence of the signal from the turbulent mixing is that the signals generated by each frequency have a common-mode plasma variation in ion velocities. These variations would normally cause changes in the resulting flame ionization signal. However, as they are identical (common mode) to two or more of the excitation frequencies, they are cancelled through the difference frequency wave mixing process that generates the even-order harmonic distortion. In this way, by monitoring the IMD amplitude between the different excitation frequencies of the associated even-order Fourier components generated via the flame ionization signal, a signal proportional to the FAR is obtained that is free of the effects of common-mode variations. For example, if the excitation frequencies are 5 kHz, 3 kHz and 300 Hz, the difference frequency 5 kHz–3 kHz–300 Hz is 1700 Hz. Alternatively, if the excitation frequencies are 5 kHz and 1 kHz, the difference frequency is 2 kHz and the sum frequency is 6 kHz, etc. It shall be noted that it is not necessary to use the difference frequency to get a subtraction of the common-mode noise. As long as there is an inter-modulation between two or more frequencies, the effect of the removal of the common mode variations appears to occur at certain combinations of the cross-modulation.

In one embodiment, a sine wave generator utilizes a high voltage, monolithic operational amplifier IC for the excitation frequency amplifier such as Analog Devices® ADA 4700-1+/−50 V precision operational amplifier, a Texas Instruments® TMS320C5525 DSP for the FFT processing and algorithm implementation, and also the frequency generation via direct digital synthesis (DDS) for the sine wave excitation functions. If this DSP implementation is not powerful enough, a higher power, higher resolution and fidelity version such as the Texas Instruments® DM3725 digital media processor IC with 1 GHz ARM® microprocessor commonly used for real-time voice recognition and data streaming as used in the Amazon® Dot/Echo (Alexa) appliances. Peripheral to the DSP IC's would be ADC and DAC ICs and supporting circuitry to receive and generate analog signals from/to the flame sensor probe.

The generation of the excitation frequencies require a low-distortion sine function generator capable of producing sine waves with frequencies in the range of 50 Hz to 50 kHz and it must be able to produce output voltages up to +/−50 V peak-to-peak when loaded into a high impedance (e.g., at least a 27 kOhm) load. The resulting signal is read out by a preamplifier and ADC that produces a signal of at least 16 bits in resolution and a sampling frequency of at least 44.1 kHz. The device that provides the FFT processing can be hardware based, e.g., a DSP chip or via software in a computer program running on a computer or other embedded microprocessor. The interpretation and conversion of the FFT coefficients into a value representative of the FAR is then performed in a simple program in the main combustion control algorithm of the main burner controller motherboard with an embedded microprocessor. Peripheral to these core electronic components are the flame ionization sensor probes mounted in the flame zone, the flame detection circuitry, and the combustion flow controller that can accept a proportional feedback signal to effect closed-loop active control of the fuel flow rate.

Reliability of electrodes and electronics etc. may depend on soot formation on the flame sensing electrodes. Since the signal produced by this technique removes the common-mode differences between two different excitation frequencies, soot formation or other changes that affect the electrical conductivity of the electrodes is not an issue. The operation of the combustion controller is critically-dependent on the flame sensor always working reliably. Otherwise, the flame detection system will not permit a valid light-off condition to exist, or conversely, cannot tell the system to automatically shut off the fuel flow if the flame were to extinguish itself.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for establishing a relationship between intermodulation distortion amplitude and fuel-to-air ratio (FAR) of a fuel and air combustion system having a combustion chamber, said method comprising:
   (a) generating more than one excitation frequency component via a device into the combustion chamber, amplifying said more than one excitation frequency component to achieve a voltage level and feeding said more than one excitation frequency component into the combustion chamber to produce frequency responses for FAR conditions comprising a first set of conditions ranging from fuel-to-air ratios above stoichiometric with flame to fuel-to-air ratios below stoichiometric with flame and a second set of conditions ranging from fuel-to-air ratios above stoichiometric without flame to fuel-to-air ratios below stoichiometric without flame;

(b) from said frequency responses, calculating Fourier frequency components of said frequency responses;
(c) subtracting a signal corresponding to a FAR condition without flame from each of said Fourier frequency components of said frequency responses; and
(d) taking a combined sum of the amplitudes of the Fourier frequencies of the difference-frequency component and sum-frequency component of said more than one excitation frequency component to produce a relationship between inter-modulation distortion amplitude and FAR that is monotonic.

2. The method of claim 1, further comprising normalizing the amplitude of each of said Fourier frequency components of said frequency responses by the corresponding excitation frequency component.

3. The method of claim 1, wherein said more than one excitation frequency component is a signal of a frequency selected from a frequency of about 1 kHz, 5 kHz, 3 kHz and 5 kHz.

4. The method of claim 1, wherein said voltage level is a level ranging from about +/−20 v to about +/−50 v signal.

5. The method of claim 1, wherein said more than one excitation frequency component are two excitation frequency components.

6. The method of claim 1, said feeding step comprises feeding said more than one excitation frequency component through a flame ionization detector.

7. The method of claim 1, wherein said device is a flame ionization probe.

8. A method for establishing a relationship between inter-modulation distortion amplitude and fuel-to-air ratio (FAR) of a fuel and air combustion system having a combustion chamber, said method comprising:
(a) generating more than one excitation frequency component via a device into the combustion chamber, amplifying said more than one excitation frequency component to achieve a voltage level and feeding said more than one excitation frequency component into the combustion chamber to produce frequency responses for FAR conditions comprising a first set of conditions ranging from fuel-to-air ratios above stoichiometric with flame to fuel-to-air ratios below stoichiometric with flame and a second set of conditions ranging from fuel-to-air ratios above stoichiometric without flame to fuel-to-air ratios below stoichiometric without flame;
(b) from said frequency responses, calculating Fourier frequency components of said frequency responses;
(c) subtracting a signal corresponding to a FAR condition without flame from each of said Fourier frequency components of said frequency responses;
(d) normalizing the amplitude of each of said Fourier frequency components of said frequency responses by the corresponding excitation frequency component; and
(e) taking a combined sum of the amplitudes of the Fourier frequencies of the difference-frequency and sum-frequency component of said more than one excitation frequency component to produce a relationship between inter-modulation distortion amplitude and FAR that is monotonic.

9. The method of claim 8, wherein said more than one excitation frequency component is a signal of a frequency selected from a frequency of about 1 kHz, 5 kHz, 3 kHz and 5 kHz.

10. The method of claim 8, wherein said voltage level is a level ranging from about +/−20 v to about +/−50 v signal.

11. The method of claim 8, wherein said more than one excitation frequency component are two excitation frequency components.

12. The method of claim 8, said feeding step comprises feeding said more than one excitation frequency component through a flame ionization detector.

13. The method of claim 8, wherein said device is a flame ionization probe.

* * * * *